March 28, 1950 E. W. ORTON 2,502,021
WATER WHEEL BUCKET
Filed June 24, 1946 3 Sheets-Sheet 1
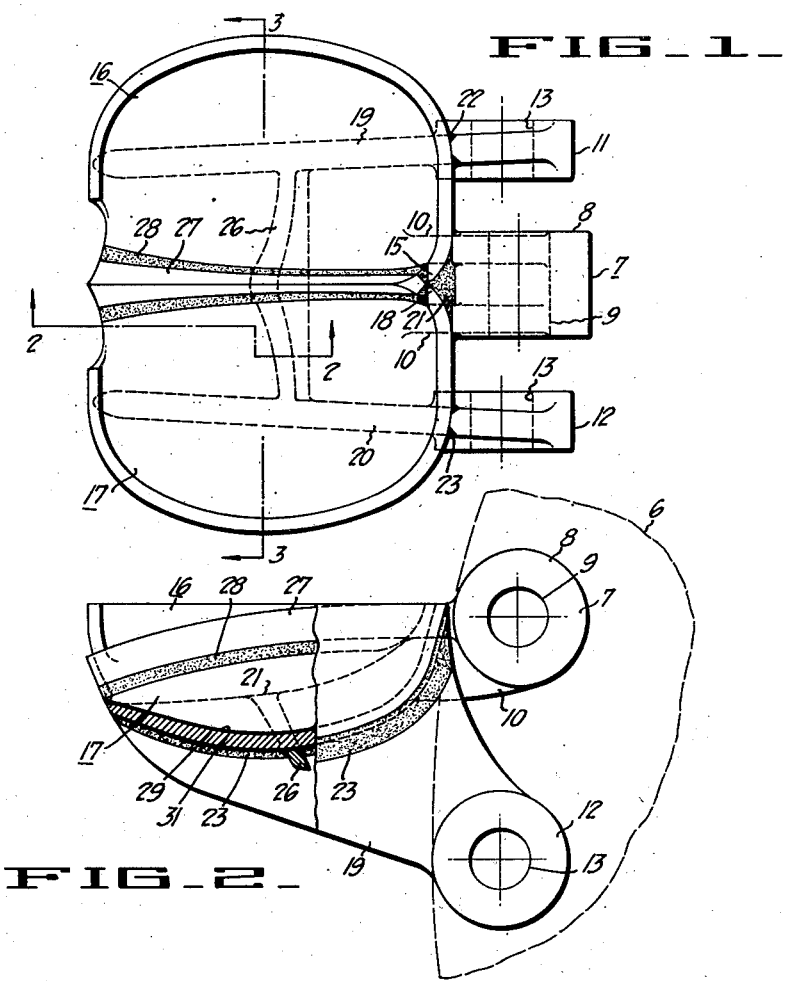
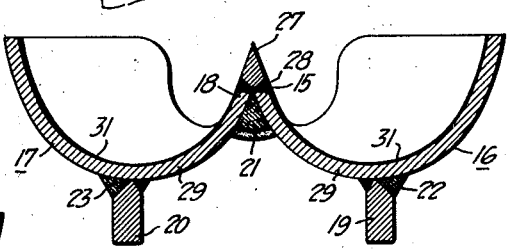
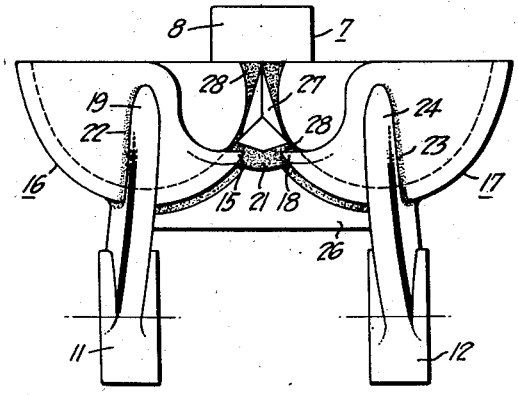
INVENTOR.
ERNEST W. ORTON March 28, 1950          E. W. ORTON          2,502,021
WATER WHEEL BUCKET
Filed June 24, 1946          3 Sheets-Sheet 2
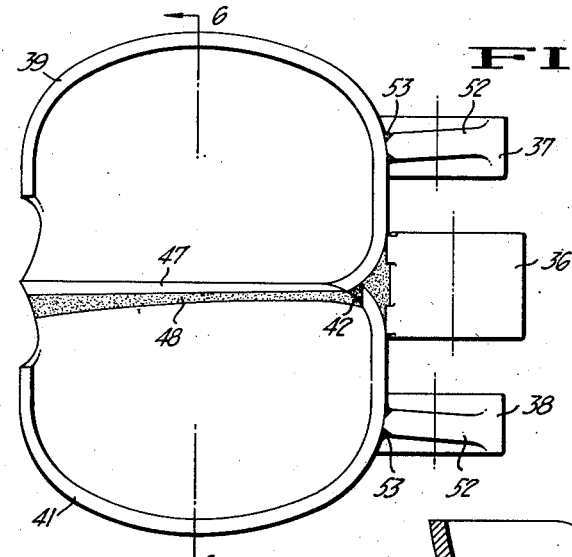
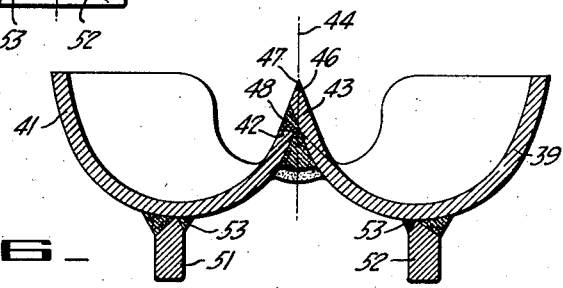
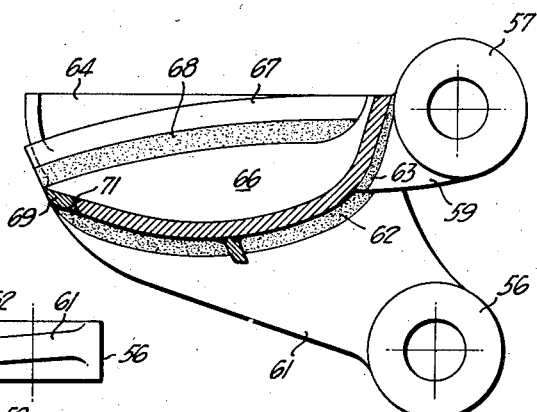
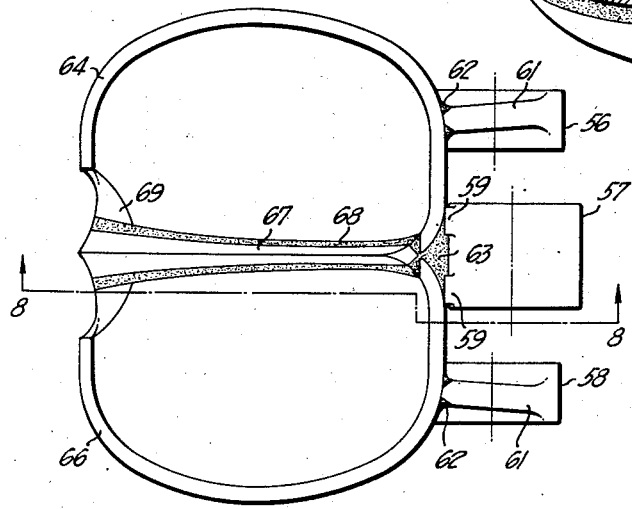
INVENTOR.
ERNEST W. ORTON March 28, 1950 E. W. ORTON 2,502,021
WATER WHEEL BUCKET
Filed June 24, 1946 3 Sheets-Sheet 3
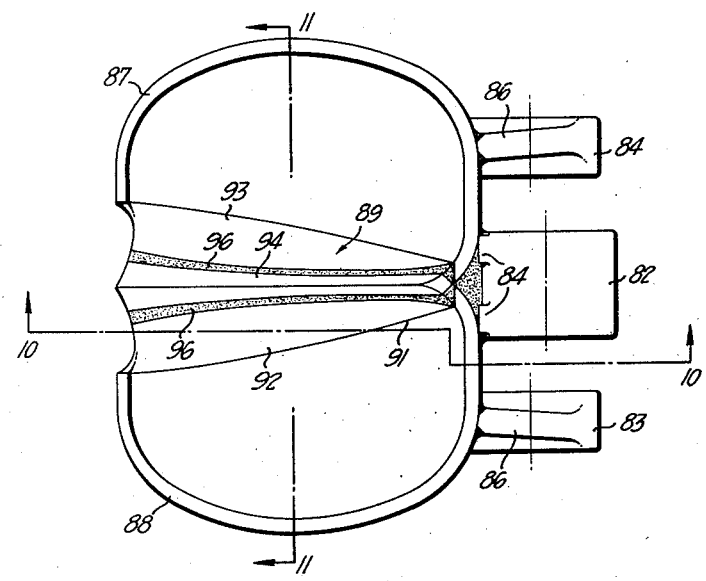
FIG_9_
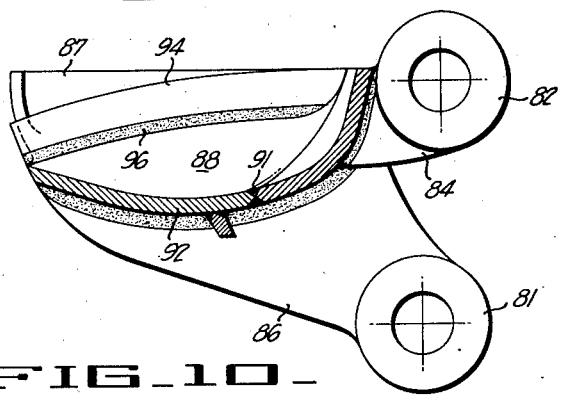
FIG_10_
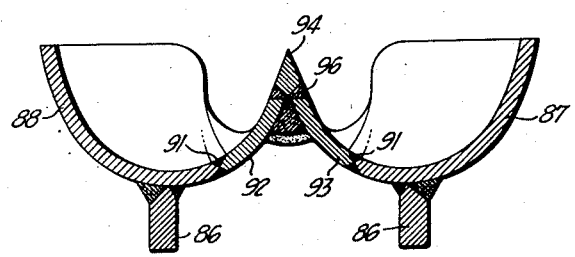
FIG_11_
INVENTOR.
ERNEST W. ORTON
BY Patented Mar. 28, 1950

2,502,021

UNITED STATES PATENT OFFICE 2,502,021

WATER WHEEL BUCKET

Ernest W. Orton, Mountain View, Calif., assignor to The Pelton Water Wheel Company, San Francisco, Calif., a corporation of California Application June 24, 1946, Serial No. 679,005

1 Claim. (Cl. 253—26)

My invention relates to water wheels, particularly of the type now utilized for large amounts of power generation, and is of the nature of the wheels disclosed in W. A. Doble, Patent 633,184, of September 19, 1899, and in G. A. Henry, Jr., Patent 728,230, of May 19, 1903. In the patents mentioned, there is disclosed a runner or rotating wheel to the rim or margin of which is attached a plurality of separate water wheel buckets, these being secured in place by suitable fastenings, such as bolts. Each of the buckets is substantially symmetrical, having mirror symmetry with respect to a median plane perpendicular to the axis of rotation of the wheel, and involves in effect two adjacent bowls for receiving in their merging central or "splitter" portion the initial impact of a stream of water. This issues tangentially from a nozzle to the wheel, and is divided by the bowls or buckets into two streams which are turned back upon themselves, thereby giving up their energy to the rotating wheel and furnishing power for various uses.

Through the course of years, water wheels have increased greatly in size and in horsepower output, and have been thrown increasingly into competition with other sources of power. It has become highly important, therefore, and in fact commercially essential that such water wheels be built, not only economically, but with the very highest possible efficiency so that the maximum amount of power can be gained from the water available. Furthermore, it has become increasingly necessary to conserve the original cost of such wheels in order that the capital investment can be reduced, since such is a major factor in the rate base of many public utilities which utilize these wheels for power production.

It is therefore an object of the invention to provide a water wheel bucket so that the initial cost of the bucket is relatively low, so that the efficiency of the bucket is relatively high, and so that the maximum use can be made of the water wheel itself.

Another object of the invention is to provide a water wheel bucket, which is subject to very little erosion or disintegration due to cavitation of water impinging thereon, whether the water is clear or whether it contains some suspended abrasive material.

A further object of the invention is to provide a water wheel bucket so that a perfectly satisfactory bucket can be fabricated with relatively unskilled labor and without the necessity of employing highly specialized equipment and tools.

An additional object of the invention is to provide a water wheel bucket which is, in general, a substantial improvement over water wheel buckets heretofore known.

Other objects, together with the foregoing, are attained by the embodiment of the invention shown in the accompanying drawings, in which Figure 1 is a plan of one form of water wheel bucket constructed in accordance with my invention.

Figure 2 is a composite cross-section, the planes of which are indicated by the lines 2—2 of Figure 1.

Figure 3 is a cross-section, the plane of which is indicated by the line 3—3 of Figure 1.

Figure 4 is a front view of the bucket shown in Figures 1 to 3, inclusive.

Figure 5 is a plan of a modified form of bucket, constructed in accordance with my invention.

Figure 6 is a cross-section, the plane of which is indicated by the line 6—6 of Figure 5.

Figure 7 is a plan of a still further modified form of bucket constructed in accordance with my invention.

Figure 8 is a cross-section of composite nature, the planes of the section being indicated by the lines 8—8 of Figure 7.

Figure 9 is a plan of a still further modified form of bucket constructed in accordance with my invention.

Figure 10 is a composite cross-section, the planes of which are indicated by the lines 10—10 of Figure 9.

Figure 11 is a cross-section, the plane of which is indicated by the lines 11—11 of Figure 9.

The water wheel bucket of my invention can be fabricated in a number of different ways and in a number of different forms, but those chosen for illustration herein are exemplary of the invention.

In the form of the invention illustrated in Figures 1 to 4 inclusive, there is provided a structure designed to be attached to the disc or central runner 6 of a water wheel of the type shown in the mentioned Doble and Henry patents. The water wheel preferably is of a type which includes, not a single disc containing the central plane of rotation of the complete wheel, but rather includes a pair of such discs, each one being situated on one side of the central plane of rotation. Secured to and between the discs 6 is a central wheel attachment lug 7 comprising principally an enlarged boss 8 having a bore 9 extending transversely therethrough for the reception of a fastening bolt likewise passing through the discs. In the event the wheel buckets are closely spaced, the bolt also passes through a pair of lateral wheel attachment lugs 11 and 12, respectively, of the adjacent bucket. These are disposed at a suitable distance from the lug 7 for cooperation with the complementary lug of the adjacent bucket. Each of the lugs 11 and 12 is formed with a through bore 13 for the reception of a portion of the fastening bolt referred to. When the bolts are removed, the lugs 7, 11 and 12 are readily removable from the wheel 6 so that an individual bucket can be readily removed and replaced.

In accordance with my invention, I depart from the prior practice of casting the lugs 7, 11 and 12 and the remaining part of the bucket in one piece. According to such prior practice, the bucket is cast of the best material available for all around service, but because of its intricacy and the general size of the casting, it is impossible to cast precisely the water impacting surfaces desired. Consequently the casting, having been withdrawn from the mold, is hand-finished by means of grinding wheels and the like, until the interior water-contacting surface is relatively smooth and is of relatively the desired efficient contour. This is an expensive undertaking and at best results in having on a single wheel a plurality of buckets which are not always of precisely the same weight nor of the same contour.

In accordance with my invention, I depart from this method of manufacture, and preferably provide a pair of blanks from which bucket bowls 16 and 17 can be formed. Since the bowls 16 and 17 are preferably arranged adjacent each other in mirror symmetry with respect to the central plane of rotation of the wheel 6, I initially choose a pair of blanks from plate metal of such a flat extent and of such an outline or contour that the blanks can be formed, say by forging or by pressing, into a pair of concave bowls, as illustrated in Figure 1. Since these bowls are made of a previously flat plate or of previously flat plate blanks, they are, even after formation into bowl-like contours, of a uniform wall-thickness throughout. This is quite advantageous in that it insures that the weight of the individual buckets and of the individual bowls is substantially the same for each of the assemblies aggregated into the total on the wheel 6.

After the bowls 16 and 17 are formed into mirror images of each other, they are preferably brought together with their adjacent margins 15 and 18 in very close juxtaposition and substantially in the central plane of rotation of the wheel 6, but with a slight space or displacement between them. Having been so positioned, the bowls 16 and 17 are secured to each other and are also secured to the extensions 10, 19 and 20 of the lugs 7, 11 and 12 by any suitable means, for example, by a weld 21, and a similar pair of welds 22 and 23. By this means, there is afforded a bucket, in effect an integral structure, but one in which the water-impacted body is of an extremely uniform cross-section and one in which there is a very smooth interior water-contacting surface. As a result of the forging or pressing operation, the surface of the bucket turns out to be sufficiently smooth so that it need not be hand-ground, although mirror grinding may be resorted to if desired or if any minor imperfections appear. Since the surface of the interior of the bowl is quite smooth, the hydraulic efficiency is increased substantially and the overall performance of the buckets is superior to that of those constructed in accordance with previous methods.

Further in accordance with my invention, there can be provided any additional reinforcements deemed necessary in accordance with sound practice. For example, spanning the space between the extensions 19 and 20, and likewise operating in contact with the two bowls 16 and 17, is a transverse brace 26, welded in position to serve as a median support for the structure.

The fact that the bowls 16 and 17 are of plate stock initially, and the fact that they are separate from the lugs 7, 11 and 12, makes it quite possible to forge or cast the lugs separately from the bowls and thus to make each of the component parts of the particular material especially suited to the service to which the part is subjected.

As an extension of this possibility, I preferably arrange matters in accordance with my invention, so that, while the margins 15 and 18 of the bucket bowls can be exposed to the initial impact of the stream of propulsion water, I preferably provide a separate splitter 27. This is constituted by a strip of appropriate cross-sectional contour and or suitable length, superimposed upon the adjacent margins of the two bowls or overlying those margins in advance thereof with respect to the oncoming water stream. The splitter is held in position of operation by an intermediate weld 28. Preferably the splitter 27 is of stainless steel or a comparable material capable of withstanding considerable erosion and perhaps of unsuitable characteristics for general bucket construction. However, the shape of the splitter 27 is relatively simple and straightforward, so that it can be included with the remaining part of the bucket by the weld 28 and can serve admirably its specialized purpose.

As a matter of fact, it is quite possible to form each of the bowls 16 and 17, not from an entirely uniform plate of metal, but rather to shape the bowl blanks of a composite material. For example, there is available a plate material which has a base 29 of an ordinary steel suitable for long life and strength, but of a relatively inexpensive nature. To this base is bonded a superficial layer 31 of a more expensive but more abrasive-resistant material, such as stainless steel. In accordance with my invention, I preferably provide a blank of the composite material, as shown in Figure 2, and form the blank in such a fashion that the improved surface material 31 is exposed and contoured for impact of the propulsion water.

With the arrangements shown in Figures 1 to 4 inclusive, there is provided a water wheel bucket of a number of different sections, each of which is fabricated of a material especially designed for the local service of that portion of the bucket. All of the bucket sections are integrated for conjoint operation by any suitable means, for example, welding.

In accordance with my invention, and especially as shown in Figures 5 and 6, there is provided a modified arrangement. In this instance, the attachment lugs 36, 37 and 38 are provided substantially as before. Also, there are two bowls 39 and 41 each fabricated of a plate blank and contoured by forging or pressing into the concave sections having mirror symmetry with respect to each other, but in this instance, the bowl sections 39 and 41 are not quite symmetrical along their adjacent margins. Rather the bowl 41 has its central margin 42 somewhat curtailed, while the bowl 39 has its central margin 43 extended so as to overlie in part the margin 42 and to extend beyond the median plane 44 of the structure. Furthermore, even though the bowl contour is substantially of uniform thickness throughout, the margin 43 is especially formed to provide a sharp dihedral angle 46 so that, in effect, a splitter edge 47 is provided by the material of the bowl 39. The two bowls 39 and 41 are held in effective relative position with the margin 43 overlapping the margin 42, as shown in Figure 6, by a suitable weld 48, and the bowl assembly is held on the extensions 51 and 52 of the lugs 37 and 38 by suitable welds 53. In this fashion, there is provided a relatively inexpensive bucket fabricated of plate stock or plate blanks and secured as an integral unit with the mounting lugs 36, 37 and 38. The hydraulic efficiency due to smoothness of surface and accurate contour of the bowls 39 and 41 is as great as in the modification shown in the preceding figures, but the splitter section is not formed of a separate specialized material.

In the modification disclosed in Figures 7 and 8, there is similarly provided a plurality of wheel attachment lugs 56, 57 and 58, having extensions 59 and 61 thereon, for fastening by a weld 62 and a weld 63 to the two bowls 64 and 66. These together with the remaining associated sections, constitute the water wheel bucket. Furthermore, there is provided a separate splitter 67 secured to the adjacent margins of the bowls 64 and 66 by a suitable weld 68. Up to this point, the construction of this arrangement is substantially the same as that shown in Figure 1, for example. It is found, however, in actual practice, that the initial contact of the bucket with the stream of water is such as to produce an unusual amount of localized wear and, consequently, in accordance with the present invention, there is provided a segregated section 69 or area symmetrically disposed with respect to the central plane and adjacent the outer periphery of the wheel. This special section is comprised of a separate piece of wear and abrasion-resistant metal disposed in immediate contact with the two bowls 64 and 66 and held in effective positional respect thereto by a weld 71. There is thus provided an area or section of specialized metal for resisting the localized extra abrasion near the edge of the bucket.

Under some conditions of operation abrasion exists, not only in a relatively small localized area, as illustrated in Figure 7, for example, but over a somewhat more extended zone. As shown in Figures 9 to 11, inclusive, I preferably provide, in accordance with my invention, the customary wheel attachment lugs, 81 and 82 and 83, having their respective extensions 84 and 86. To them is secured a pair of bowls 87 and 88, preferably fabricated in accordance with my invention by first being cut from plate blanks and then formed by forging or pressing into shapes having walls of substantially uniform thickness. In the present instance, being suitably contoured in blank, they do not form complete bowls after forming, but rather are spaced apart along their facing edges on opposite sides of the central plane of rotation.

To occupy the space between the bowls 87 and 88, and to resist the extended area of abrasion, there is provided a central insert 89 occupying a section extending for substantially the full length of the effective portion of the bucket and contoured on its upper side to complete the contours of the two otherwise substantially symmetrical bowls. The section 89 is secured in place by a weld 91 and preferably is itself fabricated of a pair of complementary sections 92 and 93, as shown in Figure 11, these sections being first formed in blanks from plate metal and then being forged or pressed into their finished contour, so that when juxtaposed in symmetry with respect to the plane of rotation, they comprise a central wear-resisting section. Additionally, an entirely different type of metal may be formed into the contour of a splitter 94 that is secured to the remaining portions of the bucket by a weld 96, so that all of the bucket members; namely, the wheel attachment lugs 81, 82 and 83, the two bowls 87 and 88, the two sections 92 and 93 making up the wear-resistant area, and the central splitter 94 are each fabricated of the particular material especially designed to withstand the particular abusive stress to which the particular part is normally subjected. All of the specialized parts are then joined together in operative or functional relationship by any appropriate means, for example, welding.

In accordance with my invention, therefore, I have provided a water wheel bucket of a composite construction so that the finished bucket is relatively inexpensive, so that it has a properly contoured interior surface to conduct the water in the most effective fashion across it, so that it has a smooth interior surface achieved without expensive hand labor in order with the contour to increase the water wheel bucket's efficiency and, finally, so that it can be fabricated of materials individually suited for individual use. The life of the bucket and its performance characteristics are consequently greatly enhanced. Furthermore, all of the water wheel buckets constructed in accordance with the invention are substantially identical. When assembled in usable relationship on a water wheel runner, they are not difficult to balance and do not in and of themselves produce deleterious stresses.

I claim:

A water wheel bucket comprising a pair of separate bowls having adjacent margins, separate impact sections for each of said bowls. a separate splitter of stainless steel substantially overlying said margins and portions of such sections, weld means for securing said bowls including said sections and said margins together for conjoint operation, wheel attachment lugs, and weld means securing said bowls symmetrically about a center line to said lugs.

ERNEST W. ORTON.

REFERENCES CITED

The following references are of record in the file of this patent:

UNITED STATES PATENTS

| Number | Name | Date |
| --- | --- | --- |
| 453,449 | Ridgway | June 2, 1891 |
| 482,927 | Porter | Sept. 20, 1892 |
| 578,812 | Cazin | Mar. 16, 1897 |
| 578,813 | Cazin | Mar. 16, 1897 |
| 603,770 | Kenney | May 10, 1898 |
| 633,184 | Doble | Sept. 19, 1899 |
| 728,230 | Henry, Jr. | May 19, 1903 |
| 776,093 | Selden | Nov. 29, 1904 |
| 1,279,320 | Camden | Sept. 17, 1918 |
| 1,448,893 | Wiki | Mar. 20, 1923 |
| 1,470,508 | Steenstrup | Oct. 9, 1923 |
| 2,323,165 | Thomas | June 29, 1943 |
| 2,354,587 | Franck | July 25, 1944 |
| 2,394,124 | Warren | Feb. 5, 1946 |